United States Patent
Lv (10) Patent No.: US 9,682,008 B2
(45) Date of Patent: Jun. 20, 2017

(54) WETNESS CONTROLLING SYSTEM AND INTELLIGENT VIBRATOR INCLUDING THE SAME

(71) Applicant: SHENZHEN FREE INTERACTIVE INC., Shenzhen, Guangdong (CN)

(72) Inventor: Xuegang Lv, Shenzhen (CN)

(73) Assignee: SHENZHEN FREE INTERACTIVE INC., Shenzhen (CN)

( * ) Notice: Subject to any disclaimer, the term of this patent is extended or adjusted under 35 U.S.C. 154(b) by 277 days.

(21) Appl. No.: 14/420,369

(22) PCT Filed: Mar. 11, 2014

(86) PCT No.: PCT/CN2014/073256
§ 371 (c)(1),
(2) Date: Feb. 8, 2015

(87) PCT Pub. No.: WO2015/135152
PCT Pub. Date: Sep. 17, 2015

(65) Prior Publication Data
US 2015/0335519 A1 Nov. 26, 2015

(51) Int. Cl.
*A61F 5/00* (2006.01)
*A61H 19/00* (2006.01)
*G05B 15/02* (2006.01)
*H04W 4/00* (2009.01)
*A61H 23/02* (2006.01)

(52) U.S. Cl.
CPC ............ *A61H 19/44* (2013.01); *A61H 19/34* (2013.01); *A61H 23/02* (2013.01); *G05B 15/02* (2013.01); *H04W 4/008* (2013.01); *A61H 2201/105* (2013.01); *A61H 2201/501* (2013.01); *A61H 2201/5002* (2013.01); *A61H 2201/5007* (2013.01); *A61H 2201/5025* (2013.01); *A61H 2201/5043* (2013.01); *A61H 2201/5053* (2013.01); *A61H 2201/5058* (2013.01); *A61H 2201/5097* (2013.01)

(58) Field of Classification Search
CPC ......... A61H 19/00; A61H 19/40; A61H 19/44
USPC ........................................ 600/38–41; 601/46
See application file for complete search history.

(56) References Cited

U.S. PATENT DOCUMENTS

| | | | | |
|---|---|---|---|---|
| 6,793,619 B1 * | 9/2004 | Blumental | ............. | A61H 19/44 600/38 |
| 7,628,744 B2 * | 12/2009 | Hoffman | ............. | A61B 5/0002 128/905 |
| 2009/0099413 A1 * | 4/2009 | Kobashikawa | ........ | A61H 19/34 600/38 |

(Continued)

Primary Examiner — John Lacyk (57) ABSTRACT

The present invention discloses a wetness controlling system for intelligent vibrator and an intelligent vibrator capable of controlling wetness. The wetness controlling system for intelligent vibrator includes an intelligent vibrator, an intelligent terminal for controlling a degree of wetness of the surface of the intelligent vibrator. The intelligent vibrator wirelessly communicates with the intelligent terminal. The intelligent terminal generates a first controlling demand for controlling the wetness controlling unit to adjust the degree wetness of the intelligent vibrator according to the degree of wetness detected by the wetness sensor, thereby allowing users to select a pleasant degree of wetness according to need for better user experience while providing a better user interface.

20 Claims, 6 Drawing Sheets (56) References Cited

U.S. PATENT DOCUMENTS

2013/0060081 A1\* 3/2013 Carter .................... A61H 19/44
                                                    600/38
2013/0172791 A1\* 7/2013 Golan .................... A61H 19/44
                                                    601/46

\* cited by examiner

WETNESS CONTROLLING SYSTEM AND INTELLIGENT VIBRATOR INCLUDING THE SAME

TECHNICAL FIELD

The invention relates to sex products, and more particularly, relates to a wetness controlling system for intelligent vibrator and an intelligent vibrator including a wetness controlling system.

BACKGROUND

With the improvement of people's living standard, people's attitude towards sex is gradually emancipating and the requirement for sexual life is getting higher. A vibrator is for meeting the requirement of sexual needs. A current vibrator controls the vibration intensity and vibration mode of motor by buttons mounted on the intelligent vibrator. The control mode of the current vibrator is fixed. The function of the current vibrator is single. Because there is no display screen to display the specific working mode, users can know the working mode only when the vibrator is activated. Moreover, the users can't directly enter into a desired mode for there is only one mode shift key. What's more, the degree of wetness of surface of the current vibrator can't be adjusted, which is inconvenient.

SUMMARY

The technical problem of the present invention needs to be solved is providing a wetness controlling system for intelligent vibrator and an intelligent vibrator capable of controlling wetness for overcoming the defects in prior arts.

A solution to solve the technical problem of the present invention is:

A wetness controlling system for intelligent vibrator includes an intelligent vibrator, an intelligent terminal for controlling a degree of wetness of the surface of the intelligent vibrator, and the intelligent vibrator is wirelessly communicated with the intelligent terminal.

The intelligent vibrator includes a wetness sensor for collecting a degree of wetness of the surface of the intelligent vibrator, a first radio frequency unit for transmitting a wetness signal corresponding to the degree of wetness to the intelligent terminal and receiving a first controlling command from the intelligent terminal, a first main controlling unit connected to the wetness sensor and the first radio frequency unit, and a wetness controlling unit connected to the first main controlling unit for adjusting the degree of wetness of the surface of the intelligent vibrator according to the first controlling command.

The intelligent terminal includes a second radio frequency unit for receiving the wetness signal and transmitting the first controlling command, and a second main controlling unit connected to the second radio frequency unit for processing the received wetness signal into the first controlling command to control the degree of wetness of the surface of the intelligent vibrator.

Further, the intelligent vibrator further includes a power unit connected to the first main controlling unit for supplying power to the intelligent vibrator, a motor unit connected to the first main controlling unit for controlling the intelligent vibrator, and a switch unit connected to the first main controlling unit for controlling operating state of the intelligent vibrator. The power unit is connected to the motor unit for supplying power to the motor unit.

Further, the power unit includes a charging unit connected to the first main controlling unit for charging the intelligent vibrator, a detecting unit connected to the first main controlling unit for detecting a voltage of the intelligent vibrator, a power supplying unit connected to the first main controlling unit for supplying power to the intelligent vibrator. The charging unit is connected to the first main controlling unit through the detecting unit. The power supplying unit is connected to the wetness sensor and supplying power to the wetness sensor.

Further, the switch unit includes a mode switch for selecting an operation mode, and a regulating switch for controlling the vibration intensity of the intelligent vibrator.

Further, the intelligent vibrator includes a header, a holding portion configured for facilitating holding, and an extending portion adjacent to the holding portion and extending from a side edge of the holding portion. The motor unit includes a first electric motor and a second electric motor disposed in the header and the extending portion respectively.

Further, the intelligent vibrator further includes a storage unit connected to the first main controlling unit for storing the degrees of wetness, a clock unit connected to the first main controlling unit for providing clock signals, a power-on reset unit connected to the first main controlling unit, and a LED lamp connected to the first main controlling unit.

Further, the intelligent terminal further includes a display unit for displaying remaining power and current degree of wetness of the intelligent vibrator, an alarm unit for generating a warning message according to the remaining power, a data input unit for inputting a desired degree of wetness and a desired vibration intensity so as to adjust the intelligent vibrator. The display unit, the alarm unit, the data input unit are connected to the second main controlling unit.

Further, the intelligent terminal further includes a video playing unit connected to the second main controlling unit for playing videos. The second main controlling unit processes the video played by the video playing unit into a second controlling command to control the vibration intensity of the intelligent vibrator.

Further, the first radio frequency unit communicates with the second radio frequency unit using at least one of wireless communication modes of Bluetooth, Wi-Fi, UWB, TD-SCDMA, ZigBee, DAB, DMB, or WiMax.

The invention also discloses an intelligent vibrator capable of controlling wetness. The intelligent vibrator is wirelessly communicated to an intelligent terminal. The intelligent vibrator includes a wetness sensor for collecting data corresponding to a degree of wetness of the surface of the intelligent vibrator, a first radio frequency unit for transmitting the data corresponding to the degree of wetness to the intelligent terminal and receiving a first controlling command from the intelligent terminal, a first main controlling unit connected to the first radio frequency unit and the wetness sensor respectively, and a wetness controlling unit connected to the first main controlling unit for adjusting the degree of wetness of the surface of the intelligent vibrator according to the first controlling command.

Compared with the prior arts, the present invention has advantages as follows: the intelligent terminal wirelessly communicated with the vibrator generates a first controlling demand for controlling the wetness controlling unit to adjust the degree of wetness of the vibrator according to the degree of wetness detected by the wetness sensor, thereby allowing users to select a pleasant degree of wetness according to needs for better user experience while providing a better user interface.

BRIEF DESCRIPTIONS OF THE DRAWINGS

The present invention will be described in detail with reference to the drawings and embodiments. In the drawings.

Labels in the drawings represent as follows.

intelligent vibrator 1, first main controlling unit 101, first radio frequency unit 102, wetness sensor 103, wetness controlling unit 104, power unit 105, charging unit 1051, detecting unit 1052, power supply unit 1053, motor unit 106, first electric motor 1061, second electric motor 1062, switch unit 107, mode switch 1071, regulating switch 1072, storage unit 108, clock unit 109, power-on reset unit 110, LED lamp 111, header 120, holding portion 121, extending portion 122, intelligent terminal 2, second main controlling unit 201, second radio frequency unit 202, display unit 203, alarm unit 204, data input unit 205, video playing unit 206.

DETAILED DESCRIPTION OF EMBODIMENTS

In order to have a better understanding of the technical characteristics, aims and effects of the present invention, the embodiments will be described in detail with reference to the drawings.

Figure 1:
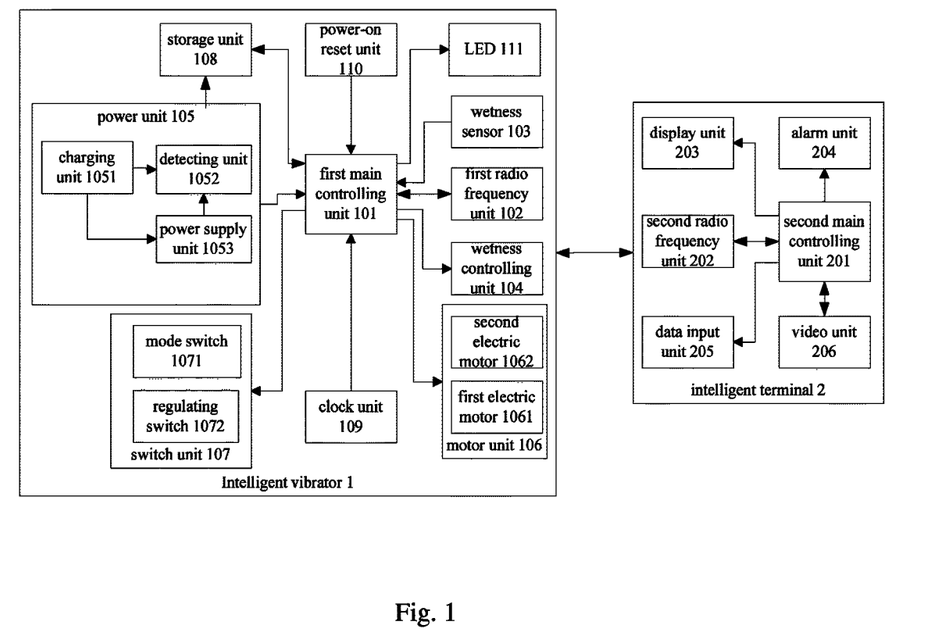
FIG. 1 is a functional block diagram of a wetness controlling system of an intelligent vibrator in one embodiment of the invention.

FIG. 1 shows the functional block diagram of the wetness controlling system for an intelligent vibrator. The wetness controlling system includes an intelligent vibrator 1 and an intelligent terminal 2 for controlling a degree of wetness of the surface of the intelligent vibrator 1. The intelligent vibrator 1 is wirelessly communicated with the intelligent terminal 2.

In detail, the intelligent vibrator 1 includes a wetness sensor 103 for collecting a wetness signal corresponding to the degree of wetness of the surface of the intelligent vibrator 1, a first radio frequency unit 102 for transmitting the wetness signal to the intelligent terminal 2 and receiving a first controlling command from the intelligent terminal 2, a first main controlling unit 101 connected to the first radio frequency unit 102 and the wetness sensor 103, and a wetness controlling unit 104 connected to the first main controlling unit 101 for adjusting the degree of wetness of the surface of the intelligent vibrator 1 according to the first controlling command. The intelligent terminal 2 includes a second radio frequency 202 unit for receiving the wetness signal and transmitting the first controlling command, and a second main controlling unit 201 connected to the second radio frequency unit 202 for processing the received wetness signal into the first controlling command. In detail, when the wetness sensor 103 collects the wetness signal corresponding to the degree of wetness of the surface of the intelligent vibrator 1, the first main controlling unit 101 processes the wetness signal and transmits the processed wetness signal to the intelligent terminal 2 through the first radio frequency unit 102. Then the second main controlling unit 201 of the intelligent terminal 2 processes the processed wetness signal into the first controlling command and transmits the first controlling command to the intelligent vibrator 1 through the second radio frequency unit 202. The first main controlling unit 101 controls the wetness controlling unit 104 to adjust the degree of wetness of the surface of the intelligent vibrator 1 according to the first controlling command.

It can be understood that the first radio frequency unit 102 can communicates with the second radio frequency unit 202 using at least one of wireless communication modes, such as Bluetooth, Wi-Fi, UWB, TD-SCDMA, ZigBee, DAB, DMB, WiMax, etc.

Figure 2:
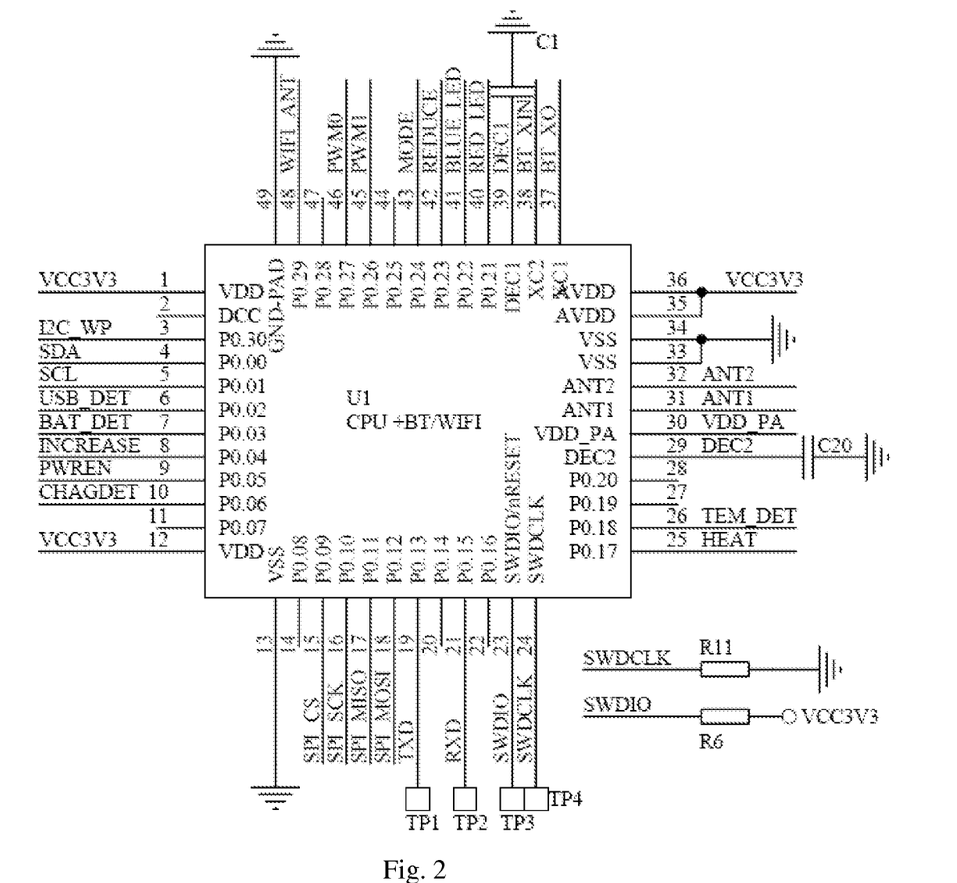
FIG. 2 is a circuit diagram of a first main controlling unit of the wetness controlling system.
Figure 3:
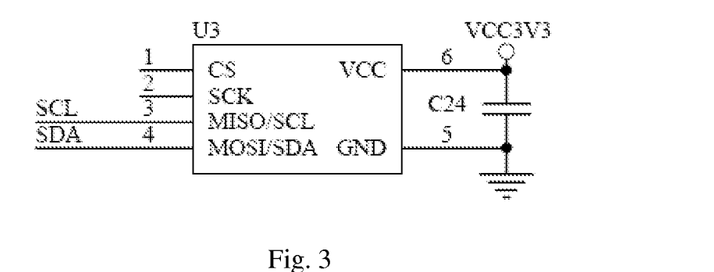
FIG. 3 is a circuit diagram of a wetness sensor of the wetness controlling system.
Figure 4:
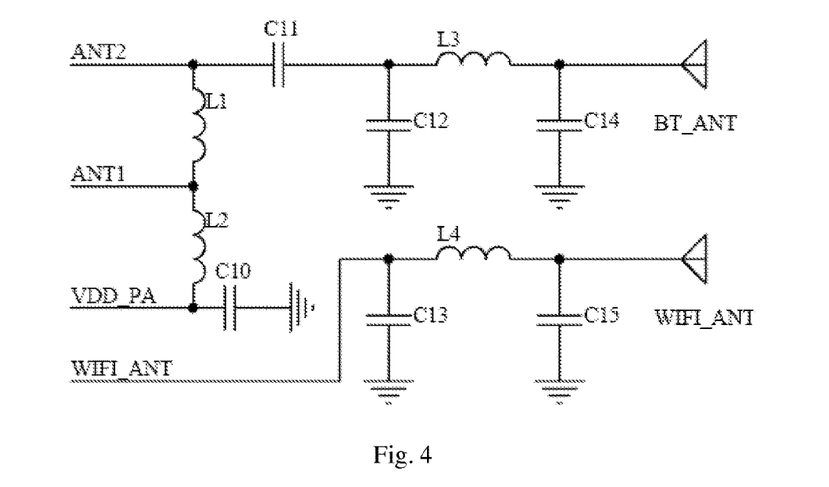
FIG. 4 is a circuit diagram of a first radio frequency unit of the wetness controlling system.

FIG. 2 is a circuit diagram of the first main controlling unit 101 in this embodiment of the invention. The first main controlling unit 101 includes a first main controlling chip U1. The first main controlling chip U1 includes a plurality of interfaces for connecting to other units. FIG. 3 is a circuit diagram of the wetness sensor 103 in this embodiment of the invention. The wetness sensor 103 includes a wetness sensing chip U3. The first main controlling chip U1 are connected to the wetness sensing chip U3 through a data line (SDA) and a clock signal line (SCL) for transmitting data between each other. FIG. 4 is a circuit diagram of the first radio frequency unit 102 in this embodiment of the invention. The first radio frequency unit 102 includes a Wi-Fi radio frequency circuit and a Bluetooth radio frequency circuit. The Wi-Fi radio frequency circuit includes an inductor L4 connected to a Wi-Fi antenna pin of the first main controlling chip U1 and a Wi-Fi antenna. Both terminals of the inductor L4 are grounded via two capacitors C13 and C15 respectively for voltage regulation. The Bluetooth radio frequency circuit includes a capacitor C10, an inductor L2, an inductor L1, a capacitor C11, an inductor L3 and a Bluetooth antenna which are connected in series. A power source output (VDD-PA) of the first main controlling chip U1 is connected to a node between the capacitor C10 and the inductor L2. Antenna interfaces (ANT1, ANT2) of the first main controlling chip U1 are respectively connected to two terminals of the inductor L1. Both terminals of the inductor L3 are grounded via two capacitors C12 and C14 respectively for voltage regulation.

The wetness sensing chip U3 transmits the collected wetness signal to the first main controlling chip U1. The first main controlling chip U1 transmits the wetness signal to the intelligent terminal 2 and receives the first controlling demand from the intelligent terminal 2 through the Wi-Fi radio frequency circuit or the Bluetooth radio frequency circuit, and then transmits the first controlling demand to the wetness controlling unit 104 to adjust the degree of wetness of the surface of the intelligent vibrator 1. It can be understood that a receiving cavity is provided in the intelligent vibrator 1 for containing lubricating fluid or other fluids. An opening is provided in the body of the intelligent vibrator 1 for connecting the receiving cavity and the surface of the body of the intelligent vibrator 1. The wetness controlling unit 104 controls the lubricating fluid or other fluids to flow to the surface of the intelligent vibrator 1 when received the first controlling demand.

The intelligent vibrator 1 further includes a power unit 105 connected to the first main controlling unit 101 for supplying power to the intelligent vibrator 1. In detail, the power unit 105 includes a charging unit 1051 connected to the first main controlling unit 101 for charging the intelligent vibrator 1, a detecting unit 1052 connected to the first main controlling unit 101 for detecting a voltage of the intelligent vibrator 1, and a power supply unit 1053 connected to the first main controlling unit 101 for supplying power to the intelligent vibrator 1. The charging unit 1051 is connected to the first main controlling unit 101 through the detecting unit 1052. The power supply unit 1053 is connected to the wetness sensor 103 and supplying power to the wetness sensor 103.

Figure 5:
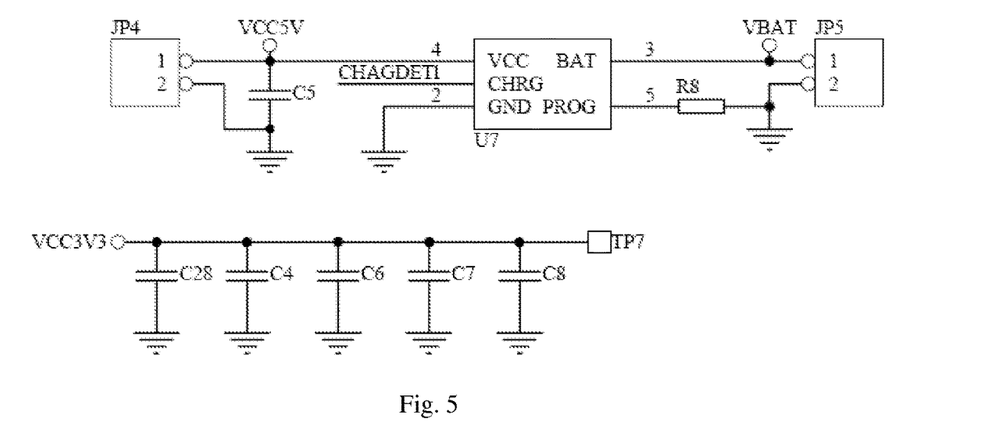
FIG. 5 is a circuit diagram of a charging unit of the wetness controlling system.

FIG. 5 is a circuit diagram of the charging unit 1051 in this embodiment of the invention. The charging unit 1051 includes a charging chip U7 connected to an external power supply interface JP4, a built in battery interface JP5, and the first main controlling chip U1. The charging unit 1051 further includes a capacitor C5 and a resistor R8 for voltage regulation. A first pin of the external power supply interface JP4 is connected to the charging chip U7. A second pin of the external power supply interface JP4 is grounded. A power input/output VCC5V is connected to a node between the charging chip U7 and the external power supply interface JP4. An output VBAT is connected to a node between the charging chip U7 and the built in battery interface JP5.

Figure 6:
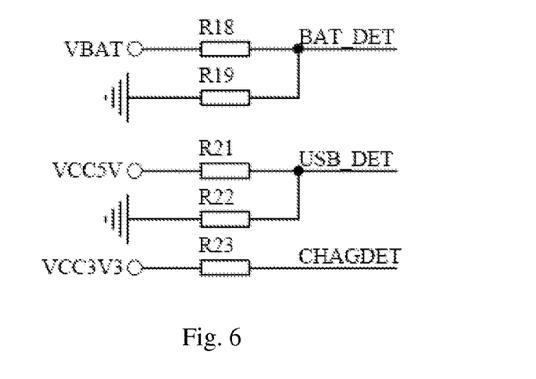
FIG. 6 is a circuit diagram of a detecting unit of the wetness controlling system.

FIG. 6 is a circuit diagram of the detecting unit 1052 in this embodiment of the invention. The detecting unit 1052 includes a resistor R23 with one terminal connected to a CHAGDET interface of the first main control chip U1 and the other terminal connected to a power output VCC3V3 for detecting the output voltage of 3.3V, a resistor R21 with one terminal connected to a USB_DET interface of the first main control chip U1 and the other terminal connected to the power input/output VCC5V. A resistor R22 is connected between the first main controlling chip U1 and the resistor R21 for detecting the output voltage of 5V. A resistor R18 with one terminal connected to a BAT_DET interface of the first main control chip U1 and the other terminal connected to a VBAT interface. A resistor R19 is connected between the first main controlling chip U1 and ground for detecting circuits connected to the VBAT interface.

Figure 7:
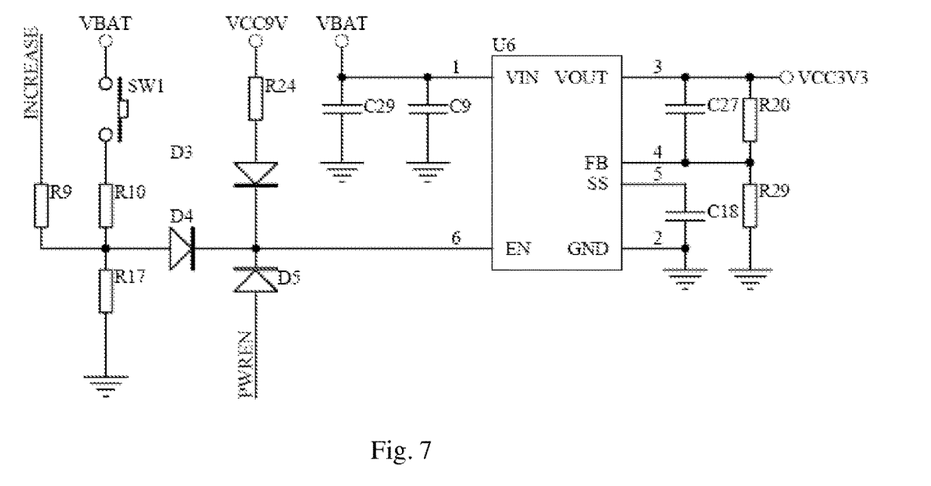
FIG. 7 is a circuit diagram of a power supply unit of the wetness controlling system.

FIG. 7 is a circuit diagram of the power supply unit 1053 in this embodiment of the invention. The power supply unit 1053 includes a power supply chip U6 with an input VIN connected to a VBAT interface of other circuit and an output connected to a VCC3V3 interface of other circuit for converting the voltage from the VBAT interfaces into 3.3V. An enable pin EN of the power supply chip U6 is connected to a cathode of a diode D4. An anode of the diode D4 is connected to a resistor R9, a ground resistor R7, and a switch SW1 and a resistor R10. The enable pin EN of the power supply chip U6 is further connected to a resistor R24 and a diode D3 which are connected in series. The other terminal of the resistor R24 is connected to a VCC9V interface of other circuit. Further, the enable pin EN of the power supply chip U6 is further connected to other circuits through a diode D5. It can be understood that the power supply unit 1053 further includes capacitors C29, C9, C18, C27, and resistors R20, and R29 for voltage regulation.

Figure 13:
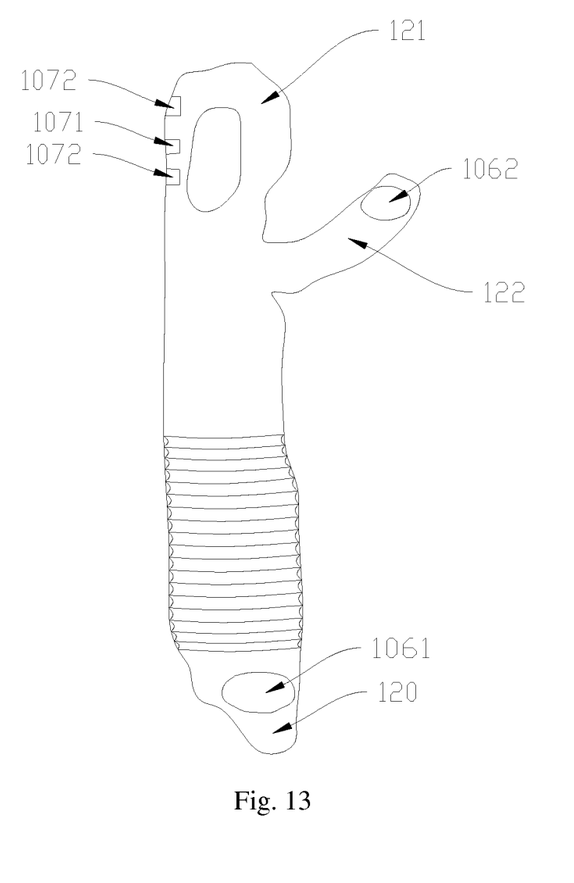
FIG. 13 is a schematic view of an intelligent vibrator in one embodiment of the invention.

Please return to FIG. 1, the intelligent vibrator 1 further includes a motor unit 106 for controlling vibration of the intelligent vibrator 1. In detail, as illustrated in FIG. 13, the intelligent vibrator 1 includes a header 120, a holding portion 121 configured for facilitating holding, an extending portion 122 adjacent to the holding portion 121 and extends from a side edge of the holding portion 121. The motor unit 106 includes a first electric motor 1061 and a second electric motor 1062 which are respectively disposed in the header 120 and the extending portion 122.

Figure 8:
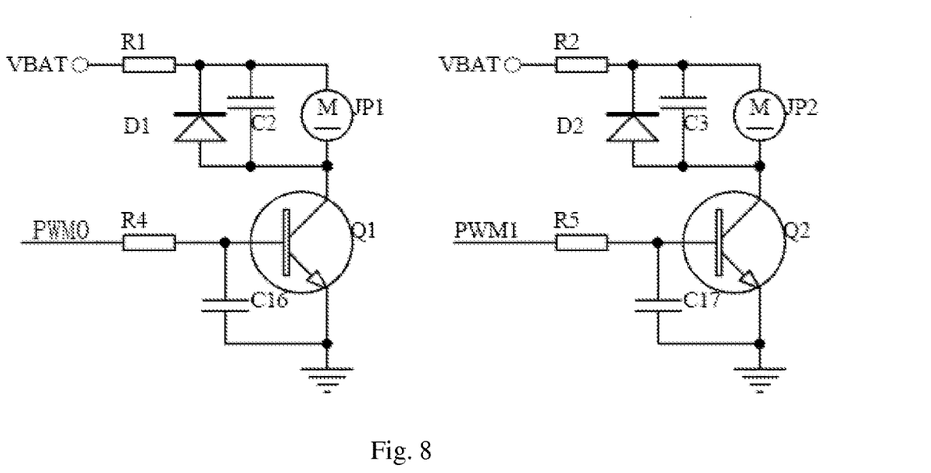
FIG. 8 is a circuit diagram of a motor unit of the wetness controlling system.

FIG. 8 illustrates the circuit diagram of the motor unit 106 in this embodiment of the invention. The motor unit 106 includes a first electric motor circuit connected to the first main controlling chip U1 for controlling the first electric motor 1061 and a second electric motor circuit for controlling the second electric motor 1062. The first electric motor circuit includes a resistor R4, a transistor Q1, an electric motor JP1, and a resistor R1 which are connected to a first pulse-width modulation pin PWM0 of the first main controlling chip U1 in sequence. The first electric motor circuit controls the electric motor JP1 according to the first main controlling chip U1. The first electric motor circuit further includes a capacitor C16, a capacitor C2, and a diode D1 for voltage regulation. The second electric motor circuit includes a resistor R5, a transistor Q2, an electric motor JP2, and a resistor R2 which are connected to a second pulse-width modulation pin PWM1 of the first main controlling chip U1 in sequence. The second electric motor circuit controls the electric motor JP2 according to the first main controlling chip U1. The second electric motor circuit further includes a capacitor C17, a capacitor C3, and a diode D2 for voltage regulation.

Figure 9:
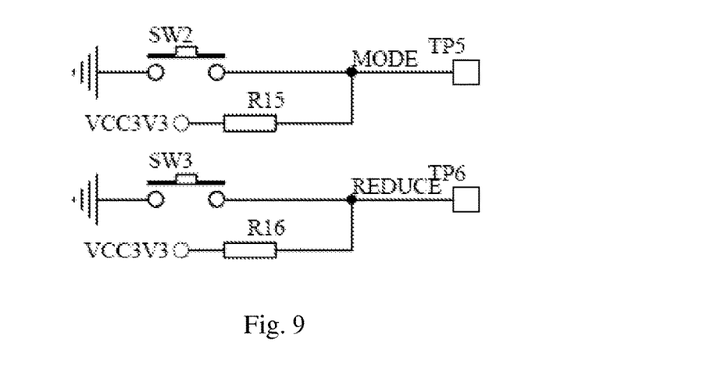
FIG. 9 is a circuit diagram of a switch unit of the wetness controlling system.

The intelligent vibrator 1 further includes a switch unit 107 for controlling the operating state of the intelligent vibrator 1. The switch unit 107 includes a mode switch 1071 for selecting an operating mode and a regulating switch 1072 for controlling vibration intensity of the intelligent vibrator 1. FIG. 9 illustrates the circuit diagram of the switch unit 107 in this embodiment of the invention. A switch SW2 is connected to the first main controlling chip U1 for controlling the intelligent vibrator 1 to select an operating mode. A resistor R15 connected to a VCC3V3 port is arranged between the switch SW2 and the first main controlling chip U1. A switch SW3 is connected to the first main controlling chip U1 for regulating the vibration intensity. A resistor R16 connected to the VCC3V3 port is arranged between the switch SW3 and the first main controlling chip U1.

Figure 10:
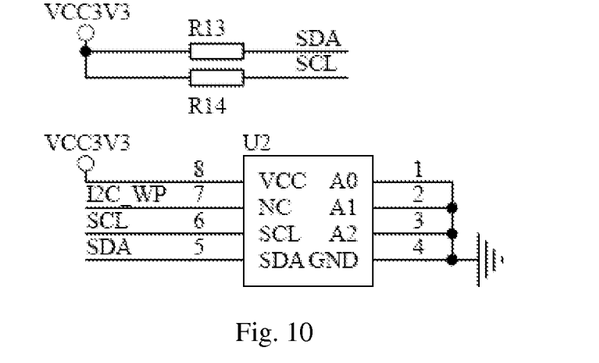
FIG. 10 is a circuit diagram of a storage unit of the wetness controlling system.
Figure 11:
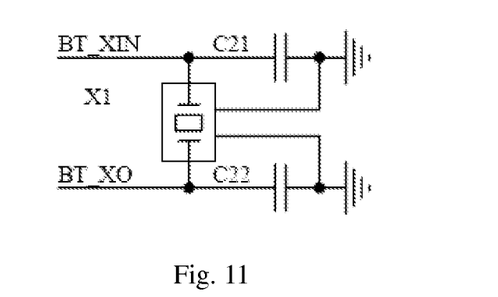
FIG. 11 is a circuit diagram of a clock unit of the wetness controlling system.
Figure 12:
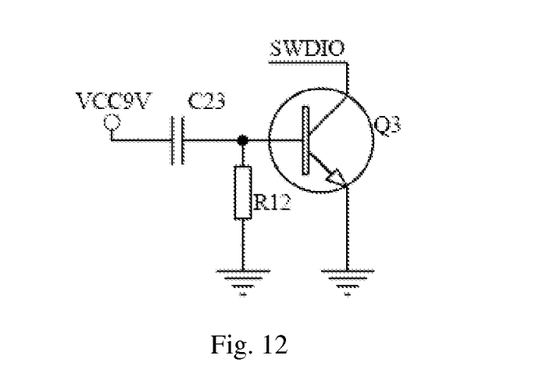
FIG. 12 is a circuit diagram of a power-on reset unit of the wetness controlling system.

The intelligent vibrator 1 further includes a storage unit 108 connected to the first main controlling unit 101 for storing wetness signals, a clock unit 109 connected to the first main controlling unit 101 for providing clock signals, a power-on reset unit 110 connected to the first main controlling unit 101, a LED lamp 111 connected to the first main controlling unit 101. FIG. 10 illustrates the circuit diagram of the storage unit 108. The storage unit 108 includes a storage chip U2 which is connected to the first main controlling chip U1 through a data line (SDA) and a clock signal line (SCL). A power pin VCC of the storage chip U2 is connected to an output pin of the charging unit 1051. FIG. 11 illustrates the circuit diagram of the clock unit 109 in this embodiment of the invention. The clock unit 109 includes a crystal oscillator X1 connected to the first main controlling chip U1, a capacitor C21 and a capacitor C22 for regulating voltage. FIG. 12 illustrates the circuit diagram of the power-on reset unit 110 in this embodiment of the invention. The power-on reset unit 110 includes a transistor Q3. A base of the transistor Q3 is connected to the charging unit 1051 through a capacitor C23. An emitter of the transistor Q3 is grounded. A collector of the transistor Q3 is connected to the first main controlling chip U1. A ground resistor R12 is connected between the base of the transistor Q3 and the capacitor C23.

The intelligent terminal 2 includes a display unit 203 connected to the second main controlling unit 201 for displaying the remaining power and the degree of wetness of the surface of the intelligent vibrator 1, an alarm unit 204 connected to the second main controlling unit 201 for generating a warning message according to the remaining power, and a data input unit 205 connected to the second main controlling unit 201 for inputting a desired degree of wetness and a vibration intensity so as to adjust the intelligent vibrator 1. User can watch the operating modes in real-time through the display unit 203 and select a desired operating mode through the data input unit 205 so as to meet the needs. It can be understood that the intelligent terminal 2 can be a smart phone, a tablet computer, or other devices.

The intelligent terminal 2 further includes a video playing unit 206 connected to the second main controlling unit 201 for playing videos. The second main controlling unit 201 processes the video played on the video playing unit 206 to a second controlling command for controlling the vibration intensity of the intelligent vibrator 1. In detail, the second main controlling unit 201 processes the video to a corresponding frequency and controls the intelligent vibrator 1 to regulate the vibration intensity in response to the second controlling command for better user experience.

The invention also provides an intelligent vibrator with wetness controlling. The intelligent vibrator 1 is wirelessly communicates with an intelligent terminal 2. In detail, the intelligent vibrator 1 includes a wetness sensor 103 for collecting a degree of wetness of the surface of the intelligent vibrator 1, a first radio frequency unit 102 for transmitting the degree of wetness to the intelligent terminal 2 and receiving a first controlling command from the intelligent terminal 2, a first main controlling unit 101 connected to the wetness sensor 103 and the first radio frequency unit 102, and a wetness controlling unit 104 connected to the first main controlling unit 101 for adjusting the degree of wetness of the surface of the intelligent vibration 1 according to the first controlling command. In detail, the first main controlling unit 101 processes the degree wetness of the surface of the intelligent vibrator 1 collected by the wetness sensor 103 and transmits it to the intelligent terminal 2 through the first radio frequency unit 102. The intelligent terminal 2 processes the degree wetness into a first controlling command for controlling the degree wetness of the surface of the intelligent vibrator 1 and transmits the first controlling command to the intelligent vibrator 1 through the second radio frequency unit 202. The first main controlling unit 101 controls the wetness controlling unit 104 to adjust the degree of wetness of the surface of the intelligent vibrator 1 according to the first controlling command.

When the wetness controlling system for the intelligent vibrator 1 provided in this invention is in the networked condition (namely that the intelligent vibrator 1 is wirelessly communicated with the intelligent terminal 2), the users can watch and control the operating mode in real time via the intelligent terminal 2, such as to solve the problems that there is no display interface on the intelligent vibrator 1 and there is no way to clearly display the detailed operating mode, and to provide better user experience. The users can artificially control the degree of wetness of the surface of the intelligent vibrator 1 and vibration intensity of the intelligent vibrator 1 by inputting a desired degree of wetness and a desired vibration intensity through the data input unit 205 of the intelligent terminal 2 to improve the feeling of usage, to meet the needs of the users, and to achieve better human-machine interaction.

The foregoing is considered to be illustrative of the principles of the present invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A wetness controlling system for vibrator comprising a vibrator (1) and a terminal (2) for controlling a degree of wetness of the surface of the vibrator (1); the vibrator (2) being wirelessly communicated with the terminal (2); wherein the vibrator (1) comprises a wetness sensor (103) for collecting a degree of wetness of the surface of the vibrator (1), a first radio frequency unit (102) for transmitting a wetness signal corresponding to the degree of wetness to the terminal (2) and receiving a first controlling command from the terminal (2) which is processed according to the wetness signal, a first main controlling unit (101) connected to the wetness sensor (103) and the first radio frequency unit (102), and a wetness controlling unit (104) connected to the first main controlling unit (101) for adjusting the degree of wetness of the surface of the vibrator (1) according to the first controlling command; wherein the terminal (2) comprises a second radio frequency unit (202) for receiving the wetness signal and transmitting the first controlling command, and a second main controlling unit (201) connected to the second radio frequency unit (202) for processing the received wetness signal into the first controlling command to control the degree of wetness of the surface of the vibrator (1).

2. The wetness controlling system for vibrator of claim 1, wherein the vibrator (1) further comprises a power unit (105) connected to the first main controlling unit (101) for supplying power to the vibrator (1), a motor unit (106) connected to the first main controlling unit (101) for controlling the vibrator (1), and a switch unit (107) connected to the first main controlling unit (101) for controlling an operating state of the vibrator (1), the power unit (105) is connected to the motor unit (106) for supplying power to the motor unit (106).

3. The wetness controlling system for vibrator of claim 2, wherein the power unit (105) comprises a charging unit (1051) connected to the first main controlling unit (101) for charging the vibrator (1), a detecting unit (1052) connected to the first main controlling unit (101) for detecting a voltage of the vibrator (1), a power supplying unit (1053) connected to the first main controlling unit (101) for supplying power to the vibrator (1), wherein the charging unit (1051) is connected to the first main controlling unit (101) through the detecting unit (1052), the power supplying unit (1053) is connected to the wetness sensor (103) and supplying power to the wetness sensor (103).

4. The wetness controlling system for vibrator of claim 2, wherein the switch unit (107) comprises a mode switch (1071) for selecting an operation mode and a regulating switch (1072) for controlling the vibration intensity of the vibrator (1).

5. The wetness controlling system for vibrator of claim 2, wherein the vibrator (1) comprises a header (120), a holding portion (121) configured for facilitating holding, and an extending portion (122) adjacent to the holding portion (121) and extending from a side edge of the holding portion (121); wherein the motor unit (106) includes a first electric motor (1061) and a second electric motor (1062) disposed within the header (120) and the extending portion (122) respectively.

6. The wetness controlling system for vibrator of claim 2, wherein the vibrator (1) further comprises a storage unit (108) connected to the first main controlling unit (101) for storing data of the degrees of wetness, a clock unit (109) connected to the first main controlling unit (101) for providing clock signals, a power-on reset unit (110) connected to the first main controlling unit (101), and a LED lamp (111) connected to the first main controlling unit (101).

7. The wetness controlling system for vibrator of claim 1, wherein the terminal (2) further comprises a display unit (203) for displaying remaining power and current degree of wetness of the vibrator (1), an alarm unit (204) for generating a warning message according to the remaining power, and a data input unit (205) for inputting a desired degree of wetness and a desired vibration intensity; wherein the display unit (203), the alarm unit (204), the data input unit (205) are connected to the second main controlling unit respectively.

8. The wetness controlling system for vibrator of claim 7, wherein the terminal (2) further comprises a video playing unit (206) connected to the second main controlling unit (201) for playing videos; wherein the second main controlling unit (201) processes the video played by the video playing unit (206) into a second controlling command to control the vibration intensity of the vibrator (1).

9. The wetness controlling system for vibrator of claim 1, wherein the first radio frequency unit communicates with the second radio frequency unit using at least one of wireless communication modes of Bluetooth, Wi-Fi, UWB, TD-SCDMA, ZigBee, DAB, DMB, or WiMax.

10. The wetness controlling system for vibrator of claim 2, wherein the first radio frequency unit communicates with the second radio frequency unit using at least one of wireless communication modes of Bluetooth, Wi-Fi, UWB, TD-SCDMA, ZigBee, DAB, DMB, or WiMax.

11. The wetness controlling system for vibrator of claim 3, wherein the first radio frequency unit communicates with the second radio frequency unit using at least one of wireless communication modes of Bluetooth, Wi-Fi, UWB, TD-SCDMA, ZigBee, DAB, DMB, or WiMax.

12. The wetness controlling system for vibrator of claim 4, wherein the first radio frequency unit communicates with the second radio frequency unit using at least one of wireless communication modes of Bluetooth, Wi-Fi, UWB, TD-SCDMA, ZigBee, DAB, DMB, or WiMax.

13. The wetness controlling system for vibrator of claim 5, wherein the first radio frequency unit communicates with the second radio frequency unit using at least one of wireless communication modes of Bluetooth, Wi-Fi, UWB, TD-SCDMA, ZigBee, DAB, DMB, or WiMax.

14. The wetness controlling system for vibrator of claim 6, wherein the first radio frequency unit communicates with the second radio frequency unit using at least one of wireless communication modes of Bluetooth, Wi-Fi, UWB, TD-SCDMA, ZigBee, DAB, DMB, or WiMax.

15. The wetness controlling system for vibrator of claim 7, wherein the first radio frequency unit communicates with the second radio frequency unit using at least one of wireless communication modes of Bluetooth, Wi-Fi, UWB, TD-SCDMA, ZigBee, DAB, DMB, or WiMax.

16. A vibrator capable of controlling wetness, the vibrator (1) wirelessly communicating with a terminal (2), wherein the vibrator (1) comprises a wetness sensor (103) for collecting data corresponding to a degree of wetness of the surface of the vibrator (1), a first radio frequency unit (102) for transmitting the data corresponding to the degree of wetness to the terminal (2) and receiving a first controlling command from the terminal (2) which is processed according to the wetness signal, a first main controlling unit (101) respectively connected to the first radio frequency unit (102) and the wetness sensor (103); and a wetness controlling unit (104) connected to the first main controlling unit (101) for adjusting the degree of wetness of the surface of the vibrator (1) according to the first controlling command.

17. The vibrator of claim 16, wherein the vibrator (1) further comprises a power unit (105) connected to the first main controlling unit (101) for supplying power to the vibrator (1), a motor unit (106) connected to the first main controlling unit (101) for controlling the vibrator (1), and a switch unit (107) connected to the first main controlling unit (101) for controlling an operating state of the vibrator (1), the power unit (105) is connected to the motor unit (106) for supplying power to the motor unit (106).

18. The vibrator of claim 17, wherein the power unit (105) comprises a charging unit (1051) connected to the first main controlling unit (101) for charging the vibrator (1), a detecting unit (1052) connected to the first main controlling unit (101) for detecting a voltage of the vibrator (1), a power supplying unit (1053) connected to the first main controlling unit (101) for supplying power to the vibrator (1), wherein the charging unit (1051) is connected to the first main controlling unit (101) through the detecting unit (1052), the power supplying unit (1053) is connected to the wetness sensor (103) and supplying power to the wetness sensor (103).

19. The vibrator of claim 17, wherein the switch unit (107) comprises a mode switch (1071) for selecting an operation mode and a regulating switch (1072) for controlling the vibration intensity of the vibrator (1).

20. The vibrator of claim 17, wherein the vibrator (1) comprises a header (120), a holding portion (121) configured for facilitating holding, and an extending portion (122) adjacent to the holding portion (121) and extending from a side edge of the holding portion (121); wherein the motor unit (106) includes a first electric motor (1061) and a second electric motor (1062) disposed within the header (120) and the extending portion (122) respectively.

* * * * *